Sept. 4, 1962 N. J. WOODLAND 3,052,405
HIGH-SPEED COLUMN-BY-COLUMN READING DEVICE
Filed Feb. 21, 1956 9 Sheets-Sheet 1

INVENTOR.
NORMAN JOSEPH WOODLAND
BY
*Joseph B. Taphorn*
ATTORNEY

Sept. 4, 1962 N. J. WOODLAND 3,052,405
HIGH-SPEED COLUMN-BY-COLUMN READING DEVICE
Filed Feb. 21, 1956 9 Sheets-Sheet 2
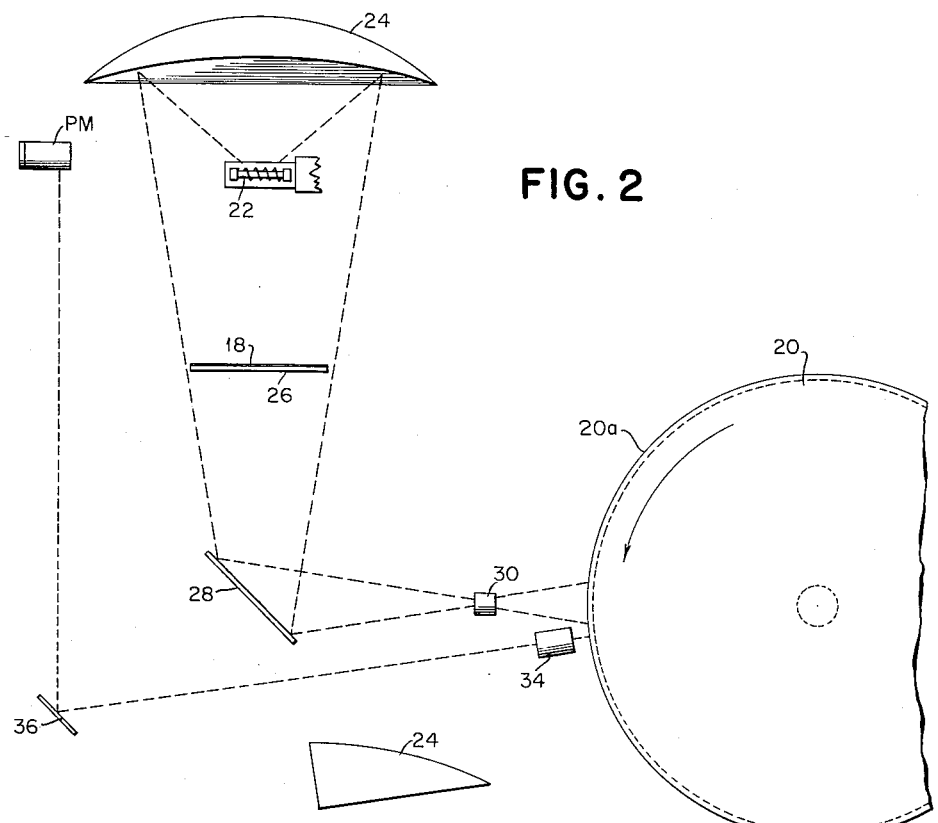
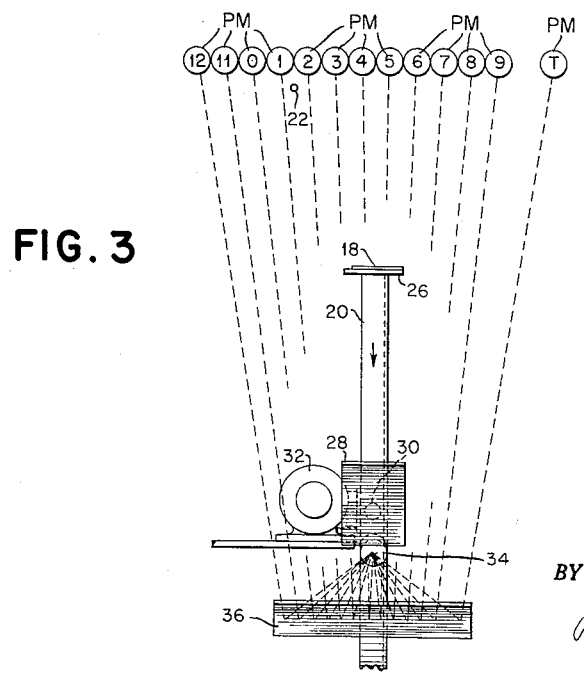
INVENTOR.
NORMAN JOSEPH WOODLAND
BY Joseph B. Taphorn
ATTORNEY Sept. 4, 1962 N. J. WOODLAND 3,052,405
HIGH-SPEED COLUMN-BY-COLUMN READING DEVICE
Filed Feb. 21, 1956 9 Sheets-Sheet 4
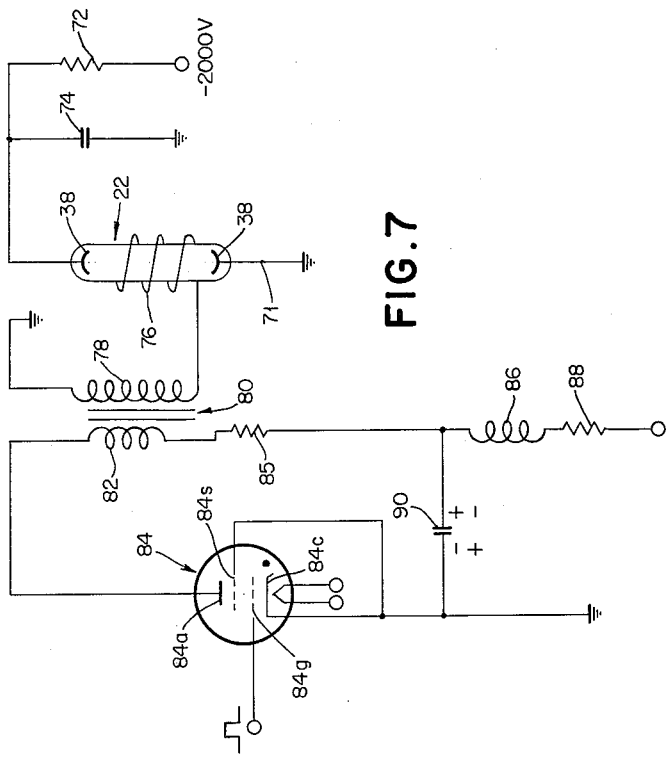
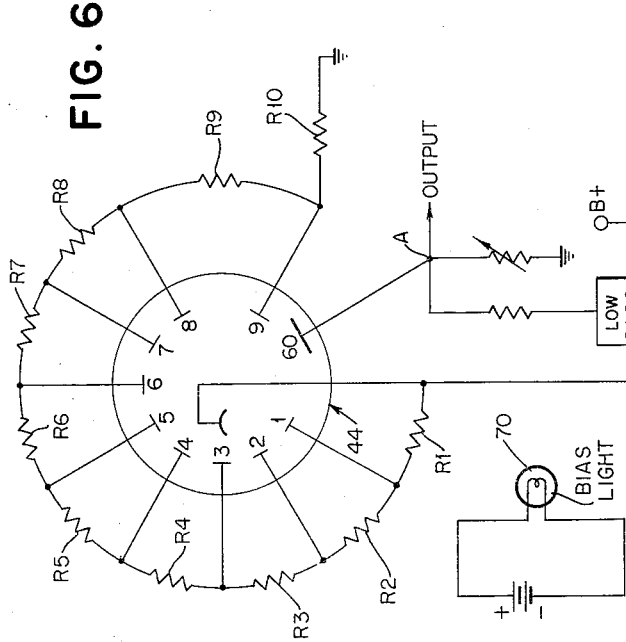
INVENTOR.
NORMAN JOSEPH WOODLAND
BY
Joseph B. Taphorn
ATTORNEY INVENTOR.
NORMAN JOSEPH WOODLAND
BY Joseph B. Taphorn
ATTORNEY

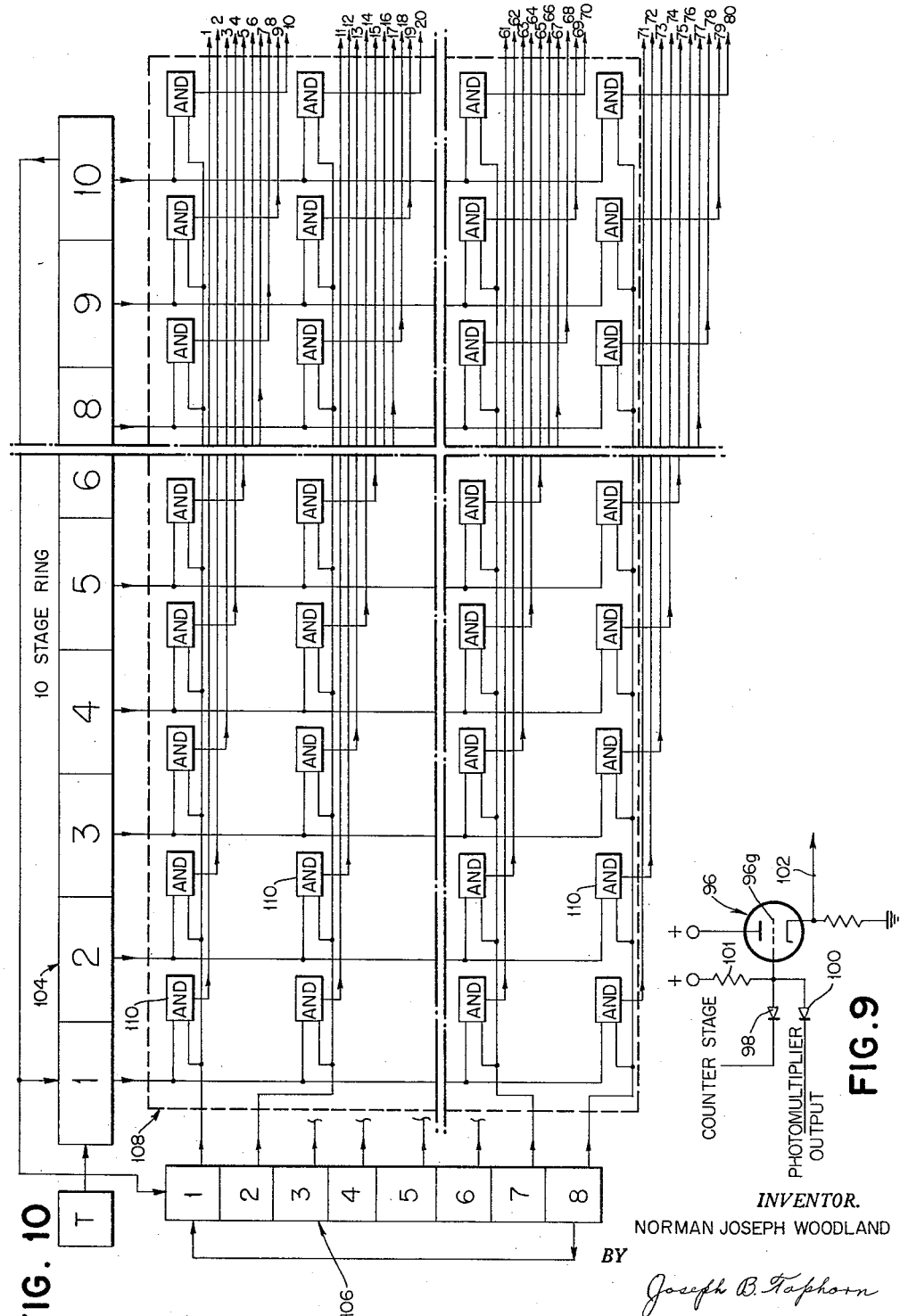

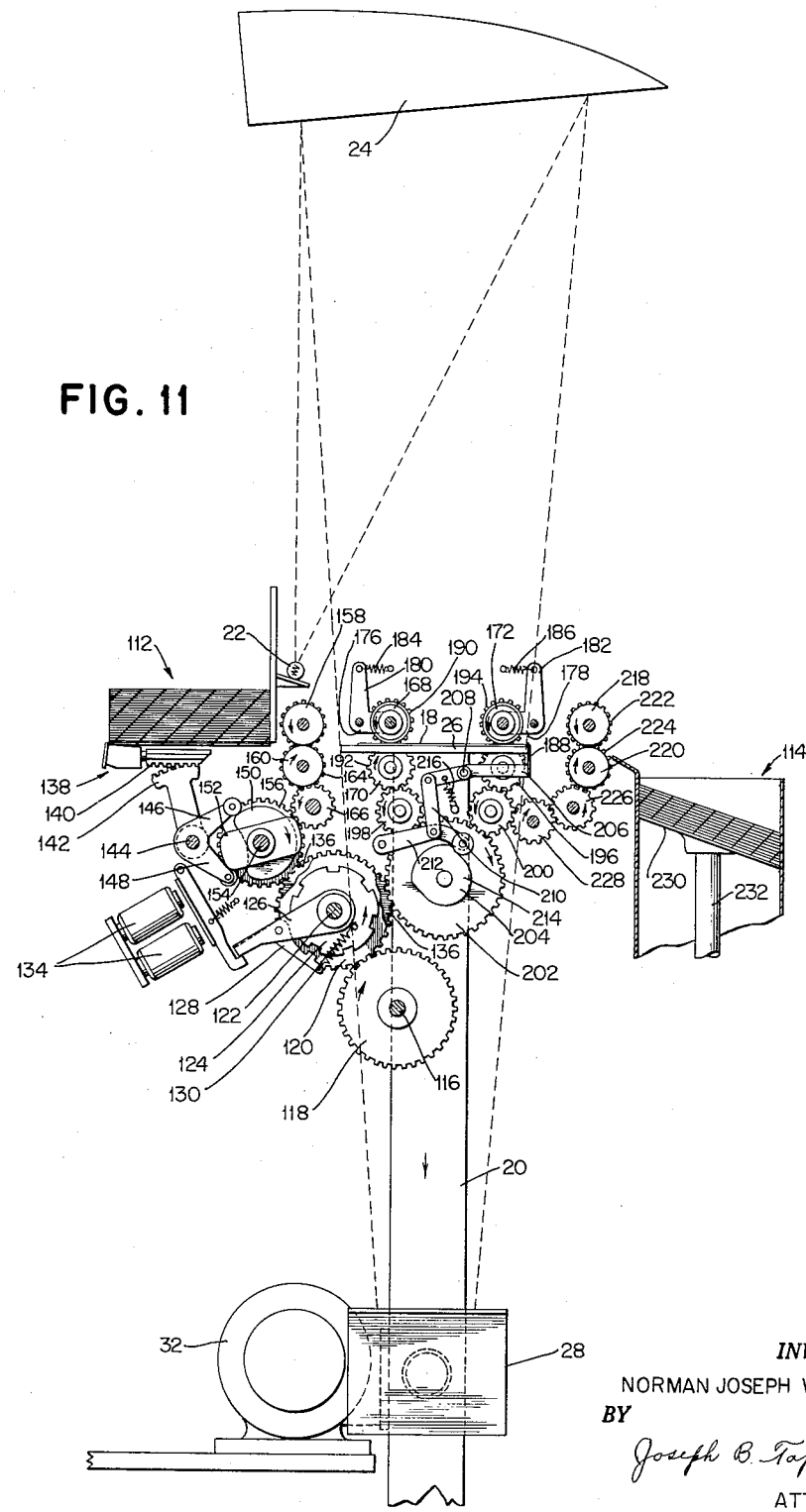

Sept. 4, 1962    N. J. WOODLAND    3,052,405
HIGH-SPEED COLUMN-BY-COLUMN READING DEVICE
Filed Feb. 21, 1956    9 Sheets-Sheet 9

INVENTOR.
NORMAN JOSEPH WOODLAND
BY
Joseph B. Taphorn
ATTORNEY

United States Patent Office 3,052,405
Patented Sept. 4, 1962

3,052,405
HIGH-SPEED COLUMN-BY-COLUMN READING DEVICE
Norman Joseph Woodland, Binghamton, N.Y., assignor to International Business Machines Corporation, New York, N.Y., a corporation of New York
Filed Feb. 21, 1956, Ser. No. 566,932
38 Claims. (Cl. 235—61.11)

This invention relates to record card reading or sensing devices and more particularly to a device for effecting the rapid serial reading of the columns of information on punched cards.

In the accounting machine field, there are employed record cards such as the standard IBM cards having eighty columns of data juxtaposed across their length. These card columns each have twelve similarly positioned index point positions which are numbered 12, 11, 0, 1, 2, 3, 4, 5, 6, 7, 8, and 9, respectively, and perforated according to a predetermined combinational code to represent various numeric, alphabetic, and special symbol characters or data. Conventionally, such cards are fed crosswise (in the short direction) with successive rows (not columns) of index point positions being successively sensed for the presence or absence of perforations or bits. Such sensing may be termed "serial by bit, parallel by character."

It may be desired, however, to utilize the information on the cards in serial order, that is, "serially by character," and perhaps, "parallelly by bit." One way of obtaining the information in that order is to feed the cards lengthwise so that they may be scanned column by column. Such card handling requires either an undesirable long card feed cycle or a presently unattainable higher card transport rate. Alternatively, the card may be fed in the conventional crosswise fashion, and the information stored in registers for serial readout, but this is an expensive arrangement in terms of both money and space.

Accordingly, it is the object of this invention to provide a relatively simple and inexpensive device for rapidly reading or sensing in serial order the data contained in the different columns of record cards.

A more specific object of the invention is to provide a device for serially reading or sensing card columns which also has the advantage of crosswise card feeding.

A further object of this device is to provide a card reader which can be operated at a rapid rate without danger of damaging the record cards and at the same time is accurate and reliable in operation.

Still another object of the invention is to provide such a card reader which is easy of construction and simple of manufacture.

According to the invention, punched cards are fed in crosswise fashion and the images thereof are recorded upon a moving phosphorescent surface by a flash of light. The moving surface, which travels in a path at right angles to the card path, then carries the card image past a row of photoelectric sensing devices astride the belt path. Since the record card was fed in the direction of its columns and the phosphorescent surface moves at right angles thereto, it follows that the images of the individual card columns, in which the perforations now appear as bright spots or pips, are serially presented to the row of photoelectric sensing devices which respond to the presence of bright spots or pips at corresponding index point positions to create electrical impulses representative of the data appearing as perforations in the corresponding card columns.

Conveniently, the phosphorescent surface is an endless one, such as the surface of a belt or drum or disc. Its decay time is such that an essentially clean surface will be presented to the row of photoelectric sensing devices by the time it arrives there a second time after an initial light exposure. In other words, the pips will be too weak to actuate the respective ones of the sensing devices after the endless phosphorescent surface has completed one revolution. In the embodiments proposed, it is not contemplated that essentially the same areas of the phosphorescent surface be necessarily repeatedly used to record the card images, though, of course, such timing may be had if desired. It might also be observed at this point that the erasing of the recorded image might be accomplished by means other than time. Thus, a "quenchable" phosphor might be utilized for purposes of compactness, speed, etc. As is well known, there are some phosphors which have a photostimulation wavelength band between the emission band and the induced band. Irradiation of a previously excited phosphor with photons in this quenching region results in a conversion of potential phosphorescence-emission energy directly into heat. Hence, by the employment of a second source emitting light at the "quenching" wavelength of a phosphor, it is possible to rerecord on a phosphorescent surface immediately after an image has been read. For further particulars on phosphors, reference is made to Leverenz, "Introduction to the Luminescence of Solids," pp. 181 and 182. New York: John Wiley, 1950.

A feature of this invention is that no timing is necessary between the feeding of the cards over the phosphorescent surface and the movement of the surface itself. Instead, it has been found that a mask may be employed to produce a timing track consisting of eighty pips corresponding to the eighty columns of information on a card when the card is imaged on the phosphorescent surface. In this way an index is obtained enabling the device, through an additional photoelectric sensing device and a simple counter, to indicate at all times which column of card information is currently being translated into electrical impulses by the other photoelectric sensing devices and to effect the switching of the data to wherever it is wanted in an accounting or like machine.

Another feature of this invention resides in the provision of a signal equalizing mask to overcome the difficulties due to the progressive exponential decay in the signal strength of the bright spots or pips formed on the phosphorescent surface. When a card is exposed to a flash, it will be evident that the pips for the last columns thereof that are imaged on the phosphorescent surface will be a greater distance from the row of photoelectric sensing devices than the pips for the preceding columns and hence will undergo greater decay before having traveled to where they are sensed. To this end, the signal equalizing mask is provided with an aperture for each card index point position which varies in size with the location of the corresponding card column. Thus, while the mask apertures for the last column of a record card correspond in size with the card perforations so that the full amount of light is allowed to pass therethrough to activate the maximum relative area on the phosphorescent surface, the apertures from this point forward gradually decrease in size so that the apertures for the first column will pass an amount of light sufficient to activate only a minimum of area on the phosphorescent surface. The relative sizes of these areas, of course, will be determined by the decay time for the particular phosphorescent material being utilized and the speed of the moving phosphorescent surface.

Several modifications of the invention are disclosed. In one arrangement the cards are shown as being imaged, in reduced size, upon the phosphorescent circumferential surface of a continuously rotatable drum. In a second embodiment, they are imaged in full size directly upon the exterior phosphorescent surface of a continuously driven endless belt. In a third embodiment, they are recorded as reduced images, through the use of a projection lens, upon a smaller continuously driven endless phosphorescent belt, and the information entered into this buffer storage is read off through the use of projection lenses which disperse the pips to a row of photoelectric sensing devices.

Other objects, features, and advantages of the invention will be pointed out in the following description and claims and illustrated in the accompanying drawings, which disclose, by way of examples, the principle of the invention and the best mode which has been contemplated of applying that principle.

In the drawings:

FIG. 2 is a longitudinal vertical section through a preferred embodiment of the invention in which the cards are imaged upon the phosphorescent surface of a continuously rotatable drum.

FIG. 3 is a left-hand end view of the embodiment shown in FIG. 2.

FIG. 6 is a schematic wiring diagram for a photoelectric sensing means used to sense the different rows of bright spots or pips upon a phosphorescent surface.

FIG. 7 is a schematic circuit for operating the flash tube shown in FIG. 4.

FIG. 9 is a wiring diagram depicting the details of the different AND circuits shown in block form in FIG. 8.

FIG. 10 is an example of a counter circuit which may be indexed by the eighty pips constituting the timing track accompanying a card image on a phosphorescent surface.

FIG. 11 is a schematic showing of a mechanism for feeding successive cards in the embodiment of FIGS. 2 and 3.

Figure 1:
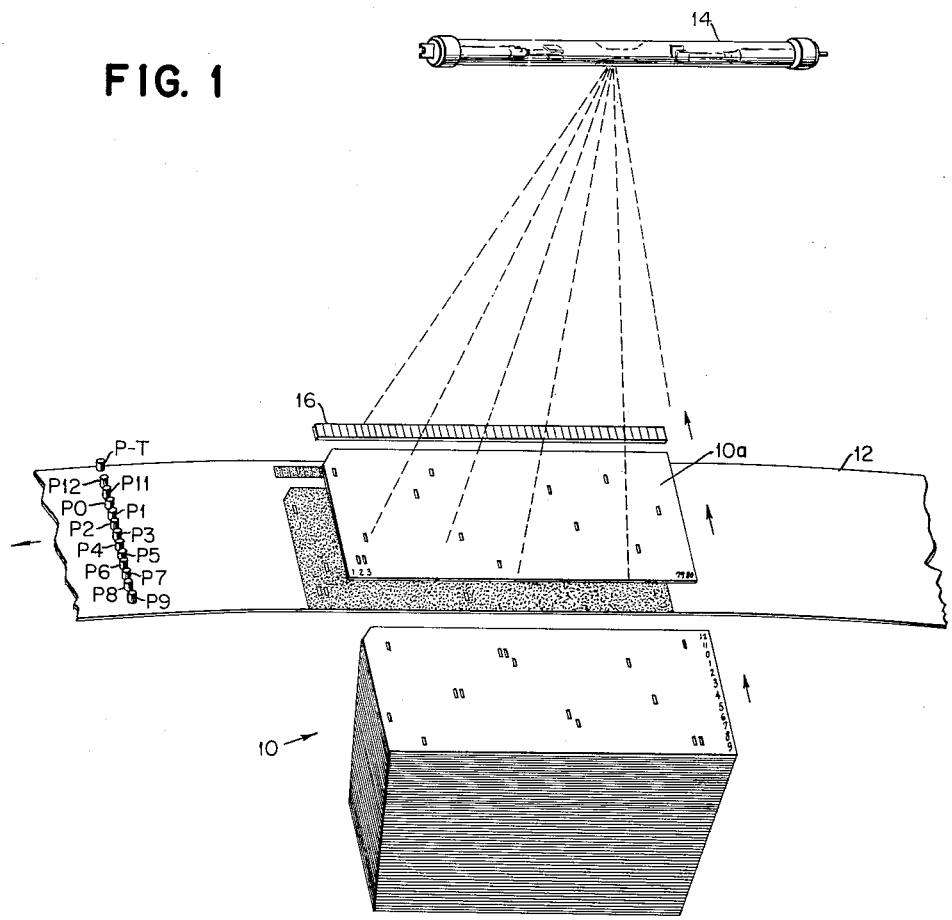
FIG. 1 is a schematic view depicting the principles of the invention.

Referring more particularly to the drawings, the essential principles of the invention are disclosed in FIG. 1. Therein, a stack of cards, generally indicated by the numeral 10, are so disposed that successive ones thereof may be fed face up from the top of the pile in the crosswise direction to a position over a continuously movable surface 12. This surface may constitute the outer circumference of a drum or the outside surface of a belt that is provided with a coating of phosphorescent material such as will have a decay time less than that required for the drum or endless belt to complete about one revolution. When a card is positioned over the surface, a flash tube 14 may be operated to record the image of the positioned card 10a on the phosphorescent surface. Not only is the image of the positioned card 10a recorded but also that of a timing mask 16 having an aperture for each possible column on the record card; in the case of standard IBM cards, these apertures would total eighty. It should be noted that suitable masks would be provided to prevent the light rays, other than those striking the timing mask and the card, from impinging on the phosphorescent surface.

Since the phosphorescent surface is continuously movable, the images of the card and of the timing track are immediately carried endwise past a row of photoelectric sensing devices, each generally indicated by the reference P. These photoelectric sensing devices, of which there is one for each row of index point positions on the card and an additional one for the timing track, sense the images of the card columns and of the timing track apertures serially, the thirteenth photo-electric sensing means P—T serving to keep track of which card column image is currently being sensed by the row of photoelectric sensing devices. When a light pip appears under any of the photoelectric sensing devices P, the particular photoelectric sensing device is actuated to change its impedance in a well known fashion to provide a discrete impulse which represents the perforation which appeared at a corresponding index point position in the particular card column. Thus, the combination of photoelectric sensing devices operated for any particular card column serves to designate the particular numeric, alphabetic, or special symbol character which was recorded therein.

The details of a particularly preferred embodiment of the invention are shown in FIGS. 2–11. As is more particularly shown in FIGS. 2 and 3, in this embodiment the image of a card 18 is recorded in reduced size upon the phosphorescent surface 20a of a continuously rotatable drum 20. The formation of the card image is accomplished by flashing a tube 22 whose light rays are reflected by a focusing mirror 24, ideally elliptical but a spherical one may suffice, on the card 18. The card 18 rests lengthwise, as seen in FIG. 2, with its face downward and its 12 edge being nearest the observer, upon a supporting quartz plate 26. The resulting image of the card 18 is projected upon a plane mirror 28 which reflects the rays through a condensing lens 30 at the focus point of the mirror 24. The image, after leaving the lens 30, falls upon the phosphorescent surface 20a of the drum 20 to be recorded thereon. The diameter of the drum is of such size with respect to the card image as to dispense with the need for an optical field curver.

Upon being recorded, the card image is carried by the drum, which is continuously rotated by a motor 32 (FIG. 3) to where the columns of bright spots or pips are successively presented to a projecting lens 34. The projecting lens picks up the bright spots or pips and directs the light rays to a plane mirror 36, which reflects them upwardly to the different ones of thirteen photomultiplier tubes PM, of which there is one for each index point position in a column and an additional or thirteenth one for the timing track. Each photomultiplier tube PM is provided with a circumferentially extending slot, which is of such width as to provide adequate resolution.

Figure 4:
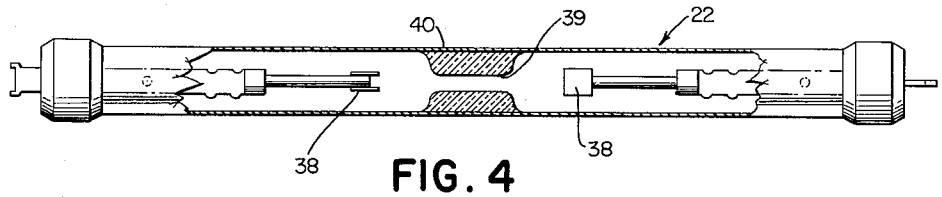
FIG. 4 is an enlarged view, partly in section, of a flash tube employed in the invention.

This embodiment employs a specially constructed flash tube 22 which is particularly disclosed in FIG. 4. It provides a pinpoint flash having a short time duration and a spectral emission in the ultraviolet range because this range is the most efficient activator of the phosphor substances employed on the phosphorescent surface. In it, a pair of electrodes 38 are separated by a capillary bore 39 formed by a quartz envelope 40. The capillary bore confines the arc so that its position is stabilized and dancing prevented. It also enables the electrodes to be closely spaced to obtain a fairly pinpoint source of light for collimation purposes. The use of the quartz envelope provides for the passage of ultraviolet rays which are normally intercepted by glass envelopes. The tube itself may be filled with Xenon gas under pressure. It requires a relatively low voltage for operation, and this gives the tube a relatively long life which minimizes the frequency of replacement. It results that a tube constructed and operated as above described produces a pulse having a short time duration, which is advantageous in that small relative motion between the card being imaged and the phosphorescent surface recording such image obtains, preventing excessive smearing of the bright spots or pips.

Figure 5:
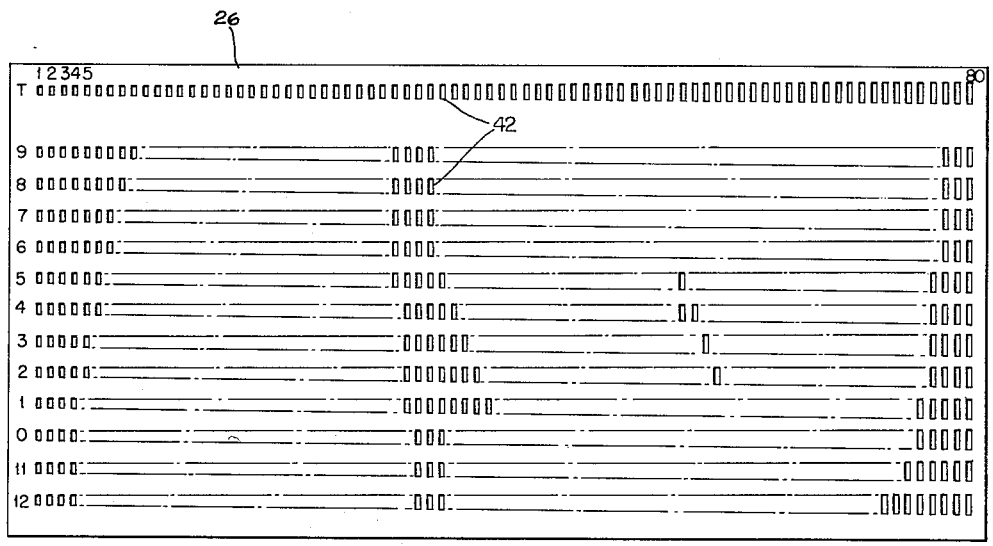
FIG. 5 is a plan view of a signal equalizing and timing track mask used to vary the area of the phosphorescent surface activated by perforations appearing in different columns of the record cards and the timing track.

FIG. 5 is a plan view of the quartz plate 26 shown in FIG. 2. This plate, in addition to being a support for the card at the imaging position, also constitutes the signal equalizing and timing mask. It is a continuous piece of material formed of quartz to enable it to pass the ultraviolet rays which lie in the absorption spectrum of the phosphorescent surface being recorded upon. The upper surface of this plate is suitably rendered opaque everywhere except at points forming windows 42, which constitute the apertures of the signal equalizing and timing mask. As a more particular inspection of FIG. 5 will reveal, the windows or apertures 42 decrease from a maximum size at the right-hand end of the drawing, which size corresponds in general with the size of the perforations which appear in the record card, to a minimum size in the other or left-hand end thereof. From an inspection of FIG. 2, it will be evident that, with the enlarged openings at the right-hand end of the quartz plate and the smaller openings at the left-hand end thereof, the bright spots or pips last to be sensed on the record drum 20 are those which constitute the larger areas of photoluminescence. Conversely the bright spots or pips resulting from information read at the left-hand end of the quartz plate 26 are those constituting the smaller areas of photoluminescence and are the first to be read through the projecting lens 34.

As was pointed out, the absorption spectrum for the phosphorescent material on the surface of the drum lies in the ultraviolet or invisible light range. Thus, glass cannot be used in the objective lens, and instead, fused quartz, acromatized by utilizing lithium fluoride, is employed. The lens mount is an iris diaphragm barrel type.

The emission spectrum of the phosphorescent surface of the drum, however, lies in the visible range. Hence, the projection lens 34 may utilize glass. Because the signal to noise ratio of the system depends directly on the speed of the projection lens, as fast a lens as is practical is employed, preferably with a short focal length. This lens, too, may be of the type having an iris barrel mount.

From a consideration of FIG. 2 of the drawings, it should be evident that the card image at the phosphorescent surface of the drum is not reversed from right to left, that is, endwise, because of the presence of the mirror 28 in the optical path. However, the card image is reversed from front to rear. Thus, the permanent timing track in the quartz plate 26 appears at the left-hand edge thereof, as viewed in FIG. 3, and if it is assumed that the card is fed from right to left, as shown in FIG. 3, the cards must be fed nine edge first with their face upward so that the first card column appears at the left-hand end of the card, as shown in FIG. 2.

FIG. 6 discloses a photoelectric sensing circuit which may be employed in the invention. In addition to a photomultiplier tube, generally indicated by the numeral 44 and which may be of the type commercially known as No. 931-A, the circuit may also include a voltage source and stability control device. A photomultiplier tube of the type 931-A is provided with nine dynode steps, the respective operating voltages being obtained through the use of a bleeder or voltage divider network R1, R2, R3, R9, R10.

The necesasry D.C. voltage may be obtained by tapping a rectifying circuit at points 46 and 48. This circuit includes high voltage alternating current source H.V.A.C. disposed in series with a smoothing choke 50 forming part of a saturable reactor 52, a smoothing capacitor 54 connected between points 46 and 48, a diode 56 whose cathode is connected to the point 48 and a current limiting resistor 58. The diode may be a half vacuum rectifier tube of the type commercially known as No. 2X2A. It can be seen that a high D.C. voltage will gradually be obtained across the capacitor 54 once the circuit is put in operation and that this voltage will be available at the points 46 and 48.

The saturable reactor 52 provides desirable voltage control which will stabilize the gain of the photomultiplier tube. This control is desirable because small changes in the voltage between the various dynode stages of a photomultiplier tube will affect to a very large degree the current amplification of the entire tube. The necessary control is obtained by connecting the output from the anode 60 of the photomultiplier tube through a low pass filter 62 of any conventional construction to the control grid of a triode 64 which is part of a cathode follower circuit. The cathode of this cathode follower circuit includes the control winding 66 of the saturable reactor 52 and thus effects a control of the voltage imparted to the photomultiplier tube by the rectifier circuit. As is well known, the amount of direct current flowing through one coil of a saturable reactor determines the permeability of the core 68. The current which will flow through the other winding (smoothing choke 50) of the saturable reactor under the influence of the A.C. voltage depends on the reactance thereof which, in turn, depends on the permeability of the iron core. Hence, there is provided a simple way for regulating a very high negative voltage with a near ground signal.

Photomultiplier tubes of the same type differ markedly, in fact, to such an extent that it is often desirable to change the circuit constants whenever a photomultiplier tube is replaced. It is a feature of this invention to provide a circuit wherein different photomultiplier tubes provide essentially the same constant sensitivity. This has been obtained by providing a constant light bias for the various photomultiplier tubes. Such a light bias, which may be any conventional lamp 70 suitably powered, provides a small, continuous, spurious signal which may be ten times as great as the dark current of the tube. In this way, the variations from a desired normal can be accommodated due to the fact that the changes in photomultiplier sensitivity will not affect manifoldly the total current in the anode circuit.

FIG. 7 shows a circuit for operating the flash tube 22 at the necessary repetition rate, for example, several thousand times a minute. It has been discovered that pulses in the order of 20,000 kilovolts are necessary to operate the particular flash tube with 2000 volts across it. As particularly shown in the drawing, one of the flash tube electrodes 38 is connected through a lead 71 to ground while the other is connected through a resistor 72 to a negative voltage source of −2000 volts. A capacitor 74 also connects the other electrode to ground. In operation, the capacitor 74 charges up to 2000 volts through the resistor 72 whose value is such that current therethrough will not sustain firing of the flash tube. Thus, the flash tube will extinguish as soon as the storage capacitor 74 discharges to a point below the sustaining voltage. It will be evident that, by a suitable choice of value in the capacitor, the duration and intensity of the flash of the tube 22 can be accurately predetermined.

The flash tube is triggered through a helical winding 76 wrapped about its surface. This winding is hit by a high voltage pulse, and the resulting high potential between the winding and the flash tube electrode 38 connected by lead 71 to ground sufficiently ionizes the flash tube 22 to enable it to be flashed by the discharge of capacitor 74 therethrough. As observed before, the flash tube extinguishes when the voltage across the capacitor 74 drops below the sustaining level.

The necessary high voltage pulse, in this case 20 kilovolts, may be obtained through transformer action. Thus, the high voltage winding 76 about the flash tube is connected to ground through the secondary winding 78 of a transformer or spark coil 80. The primary winding 82 of this transformer is connected to a circuit which provides the operating pulse in response to a control or card read signal emanating as from an accounting machine.

This circuit includes a thyratron 84 which may be of the type commercially known as 2D21. The thyratron anode 84a is disposed in series with the primary winding 82 of the transformer, a resistor 85, a choke 86, and a resistor 88 and then to a positive voltage. The cathode 84c and screen grid 84s of the thyratron are connected to ground. A capacitor 90 shunts the thyratron 84, the primary transformer winding 82, and the safety resistor 85 and provides the necessary drive for the thyratron upon the receipt of the positive read pulse upon the control grid 84g. Upon the receipt of this read pulse, the thyratron fires, and the capacitor 90 discharges therethrough to pulse the primary transformer winding 82. In turn, a high voltage is developed in the secondary transformer winding 78 and applied to the winding 76 of the flash tube to trigger the same. The thyratron extinguishes when the voltage across the capacitor passes below the sustaining voltage thereof as the value of the resistor 88 is chosen so high as to prevent its current from sustaining the thyratron. Thereafter, the capacitor 90 proceeds to charge up again, and upon the receipt of the next pulse at the control grid 84g, the above described operation will be repeated. It will be appreciated that the parameters of the circuit disclosed in FIG. 7 may be so chosen as to provide for the necessary flash tube repetition rate and the necessary voltage levels for different types of flash tubes.

Figure 8:
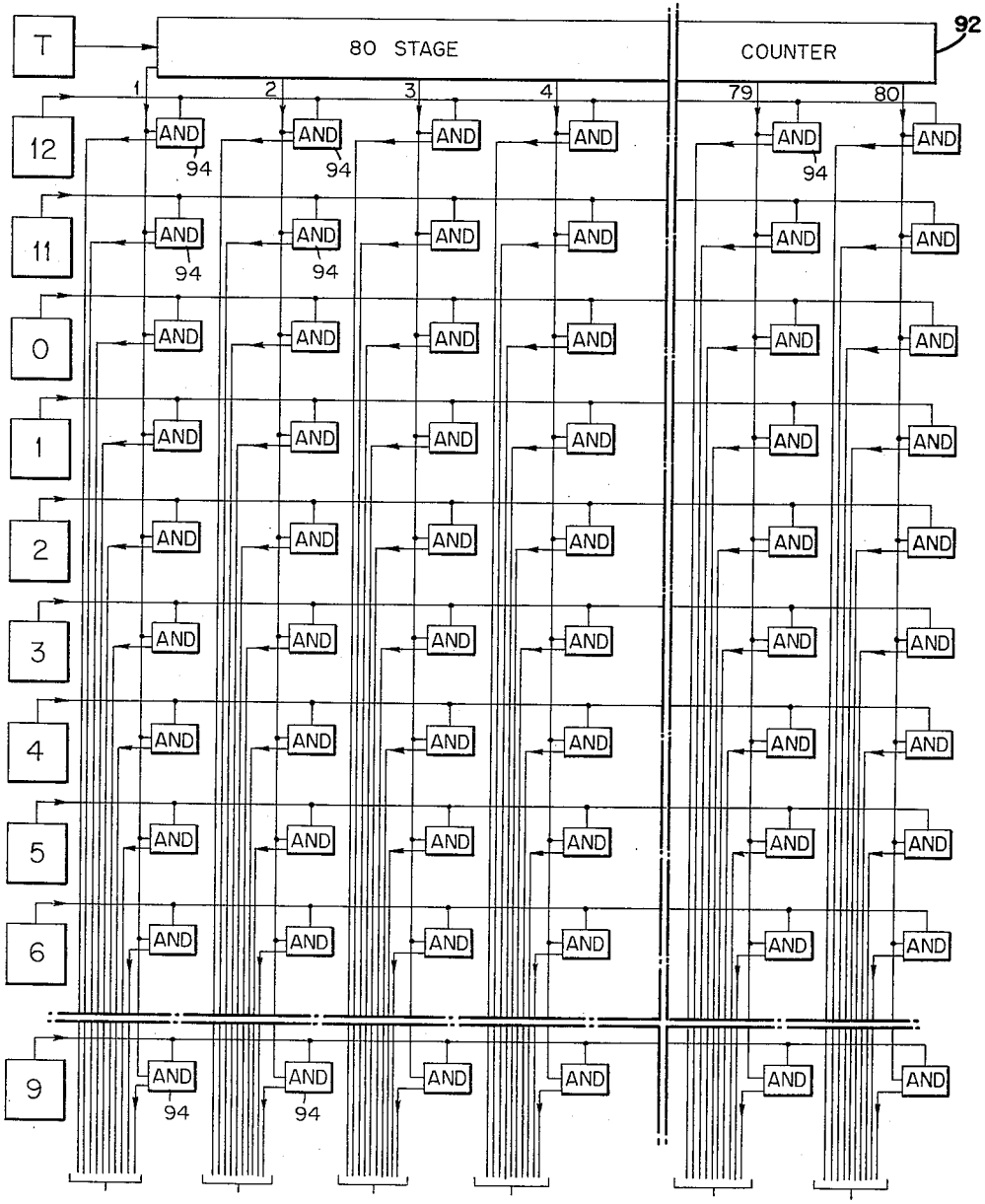
FIG. 8 is a wiring diagram showing the circuitry for switching the eighty columns of card information to different points in a machine.

FIG. 8 discloses switching circuitry for handling the outputs of the photomultiplier tubes PM. It will be recalled that the image of a timing track, as well as that of a card, was recorded each time the flash tube 22 was triggered. Thus, there were recorded on the phosphorescent surface, in addition to the card data, eighty bright spots or pips which serve as an index to indicate the particular card column image being presented to the photoelectric means at any particular time. Conveniently, the output of the photomultiplier tube, represented by the square box T, for the timing track is connected to an eighty-stage counter 92 in which the stage corresponding to the particular column passing the scanning means is rendered active at that time. These eighty stages are represented by eighty downwardly extending output leads numbered 1 through 80 in FIG. 8.

The photoelectric sensing means for the different rows of card index point positions are represented by the square boxes vertically arranged along the left-hand edge of FIG. 8 below the box T. These twelve boxes are provided with horizontal leads which extend across the figure to constitute the output leads of the corresponding photoelectric sensing means. At each intersection of the different horizontal leads with the vertical leads representing the different output stages of the eighty-stage counter, there is provided a coincidence or AND circuit 94. Each of these AND circuits has an output wire which is gathered together with the output wires for the other AND circuits for the corresponding counter stage to form a bundle of output wires, different ones of which may be simultaneously pulsed to represent the data for the corresponding card column.

Each of the coincidence or AND circuits 94 thus includes two input and one output leads. When positive pulses simultaneously appear on the input leads of an AND circuit, a voltage pulse will appear on the output lead. Evidently, then, pulses from the 12 character sensing photomultiplier means will be gated through the AND circuits which correspond to the corresponding card column as determined by the eighty-stage counter. Thus there has been provided a simple arrangement for switching the electrical impulses representing the different columns of data to different parts of an accounting machine.

The particular nature of the AND circuit 94 which may be employed in the switching circuit disclosed in FIG. 8 is shown in FIG. 9. In this AND circuit, a conventional triode tube 96 is embodied in a cathode follower circuit, the operation of which is effective to provide an output signal. The grid 96g of this triode is connected in series with a pair of parallel disposed crystal diodes 98 and 100, one of which, 98, is connected on its other side to a corresponding stage of the counter, while the other, 100, has its other side connected to the corresponding photomultiplier means. A resistor 101 also connects the grid to a plus potential. If positive pulses appear simultaneously at each of the crystal diodes, the voltage on the control grid 96g will be raised, and the tube will conduct so as to provide an output pulse on lead 102. If only one of the diodes is exposed to the positive pulse, the negative voltage appearing at the other diode is operative to maintain the grid below cut-off. Hence, only upon a coincidence of pulses will an output voltage appear at an AND circuit, and thus there is provided an effective means for gating the signals detected by the photomultiplier means to circuits corresponding to the respective card columns.

The nature of an eighty-stage counter 92, usable in the invention, is disclosed in FIG. 10. The counter may be an electronic one of the type disclosed in FIGS. 4 and 5a of United States patent application Serial No. 479,107, filed December 21, 1954. Such a counter comprises two closed rings 104 and 106 and a diode matrix 108. As is pointed out in that application, these rings may be constructed along the lines taught by the Haddad et al. Patent No. 2,551,119 issued May 1, 1951. In the instant device, one of these rings, 104, is a ten-stage ring, whereas the other, 106, has only eight stages.

Viewing FIG. 10 of the drawings more particularly, it can be seen that the outputs of the ten-stage ring, numbered 104 and diagrammatically sketched across the top of the figure, constitute the vertical leads, whereas the outputs of the eight-stage ring, numbered 106 and diagrammatically sketched along the left-hand side of the figure, constitute horizontal leads. At each intersection of the vertical and horizontal output leads, an AND circuit 110 of the type particularly disclosed in FIG. 9 is employed. Each of these AND circuits has an output circuit which constitutes a horizontal output lead brought out to the right-hand edge of FIG. 10. Thus, there are provided eighty diode matrix output leads which are consecutively numbered in the figure, and it will be evident that, as the ten-stage ring 104 is stepped along by pulses from the timing track photomultiplier means T, successive ones of the particular vertical leads will be pulsed and that, upon each complete cycling of the ten-stage ring, the eight-stage ring will be advanced one step to render the ten-stage ring effective to successively pulse the next set of ten horizontal output leads for the diode matrix. A counter having eighty stages is thus provided, and the reading of the bright spots or pips constituting the image of the timing track will step this counter along.

As has been pointed out, the cards are fed over the quartz plate 26 toward the observer viewing FIG. 2 and from left to right when seen as viewing FIG. 3, with their face down and the twelve edge leading. FIG. 11 shows a convenient arrangement for so feeding the cards. A conventional card hopper 112, wherein cards are stacked with their face down and twelve edge leading, is mounted to the left of the quartz plate 26, and a suitable mechanism is provided for feeding the cards singly from the hopper and then over the plate and to a conventional stacker magazine 114.

The drive for this card feed mechanism originates with a shaft 116 continuously driven as by the accounting machine in which the invention is employed. This shaft bears a gear 118 which meshes with a gear 120 rotatably supported on a shaft 122 and formed integral with a multi-notch disk 124. This disk forms part of a single revolution clutch whose other elements include an arm 126 affixed to shaft 122 and carrying at its outer or free end a toothed pawl 128 biased by a spring 130 for engagement with the notched disk 124. Pawl 128 and arm 126 are controlled by a spring-biased latch 132 operative when attracted by a magnet 134 to release the pawl for engagement with the disk, a notch whereon is effective to receive the pawl tooth and pull the clutch arm 126 around with the disk. If the magnet is released before the clutch arm completes one revolution, the latch will have restored to intercept the pawl to draw it out of engagement with the disk and then the clutch arm to prevent its further rotation. As the clutch arm is fixed to the shaft 122, the shaft also rotates when the clutch arm rotates, and this motion is transmitted to a gear 136 serving as the output for the clutch. It can be seen, therefore, that the operation of the clutch may be either intermittent or continuous, depending on whether the magnet 134 has been again pulsed when the clutch arm 126 approaches home position, and that by suitable mechanism a card may be advanced from the hopper 112 to a position on the quartz plate 26 and a preceding card 18 from the position on the quartz plate to the stacker 114.

The cards are fed singly from the hopper by a pair of spaced picker knife assemblies 138 of conventional design. These picker knife assemblies are slidably mounted in the bottom of the card hopper 112 and are formed on their lower sides with racks 140 which mesh with gear segments 142 mounted on a rockable shaft 144. This shaft has fixed to it a pair of cam followers 146 and 148 which coact with a pair of complementary cams 150 and 152 fixed upon a rotatable shaft 154. This shaft also carries a gear 156 which meshes with the gear 136 fixed to the shaft 122 bearing the driven element or clutch arm 126 of the single revolution clutch earlier described.

The knife assemblies 138 feed a card from the hopper during the early portion of a clutch revolution or cycle. Soon, the card is grasped by a pair of cooperating upper and lower feed rolls 158 and 160 also driven when the picker knife assemblies are operated. These feed rolls, which are comprised of individual rubber cylinders mounted on corresponding shafts, are provided at their ends with intermeshing gears 162 and 164. The gear 164 also meshes with a gear 166 which, in turn, meshes with the gear 156 mounted on the shaft 154. Thus, the operation of the clutch will also effect the operation of this pair of feed rolls.

After a card passes through rolls 158 and 160, it is advanced on the quartz plate 26 first by a cooperating pair of slip rolls 168 and 170 and then by a second cooperating pair of slip rolls 172 and 174. These slip rolls, which otherwise are similar to the feed rolls 158 and 160, have their lower rolls 170 and 174 fixedly mounted in the side frames of the machine. The upper rolls 168 and 172, however, are mounted on arms 176 and 178 pivoted to studs formed on side frames of the machine, and these arms are formed integral with upstanding lugs 180 and 182 attached to tension springs 184 and 186. These tension springs act to urge the upper rolls into engagement with the lower rolls or a card therebetween. The yieldable action of these springs, however, enables the rolls to slip with respect to the card so that the accurate positioning of the card upon the quartz plate may be determined by a gate 188 movable into and out of the card path. The pairs of slip rolls 168 and 170 and 172 and 174 are respectively driven by intermeshing gears 190 and 192 and gears 194 and 196. Gears 192 and 196 mesh with idler gears 198 and 200, and these in turn mesh with a large gear 202 fixed to shaft 204. Gear 202, in turn, meshes with the gear 136 forming the output element of the single revolution clutch so that whenever the clutch is operated, they too will be operated.

The card gate 188, which constitutes a vertical plate, is fixed at its respective ends to arms 206 pivoted upon studs 208 affixed to the framework (not shown) of the card feed unit. The other end of one of these arms is connected by a link 210 to an intermediate point of a cam follower 212. This cam follower coacts with a cam 214 fixed to rotate with the gear 202 which, as has been pointed out, is driven by the gear 136 constituting the clutch output element. The cam is so formed and mounted that, upon the initiation of operation of the clutch, the gate is lowered against the action of a spring 216 to permit the slip rolls 168 and 170 and 172 and 174 to eject the card in position on the quartz plate 26 toward the stacker 114 before the next card to be picked by the picker knife assemblies 138 from the hopper 112 is received on the quartz plate.

The card being ejected from its position on the quartz plate is soon picked up by another pair of feed rolls 218 and 220 which are like the feed rolls 158 and 160. These feed rolls, which are driven through a series of gears including gears 222, 224, idler gears 226 and 228 which mesh with the gear 200, move the card into the stacker magazine 114. This stacker magazine is of conventional design wherein the cards are received upon a sloping plate 230 on a post 232 which sinks into the magazine as the number of cards thereon increases, thereby minimizing the free card path and preventing fluttering of the cards.

Figure 12:
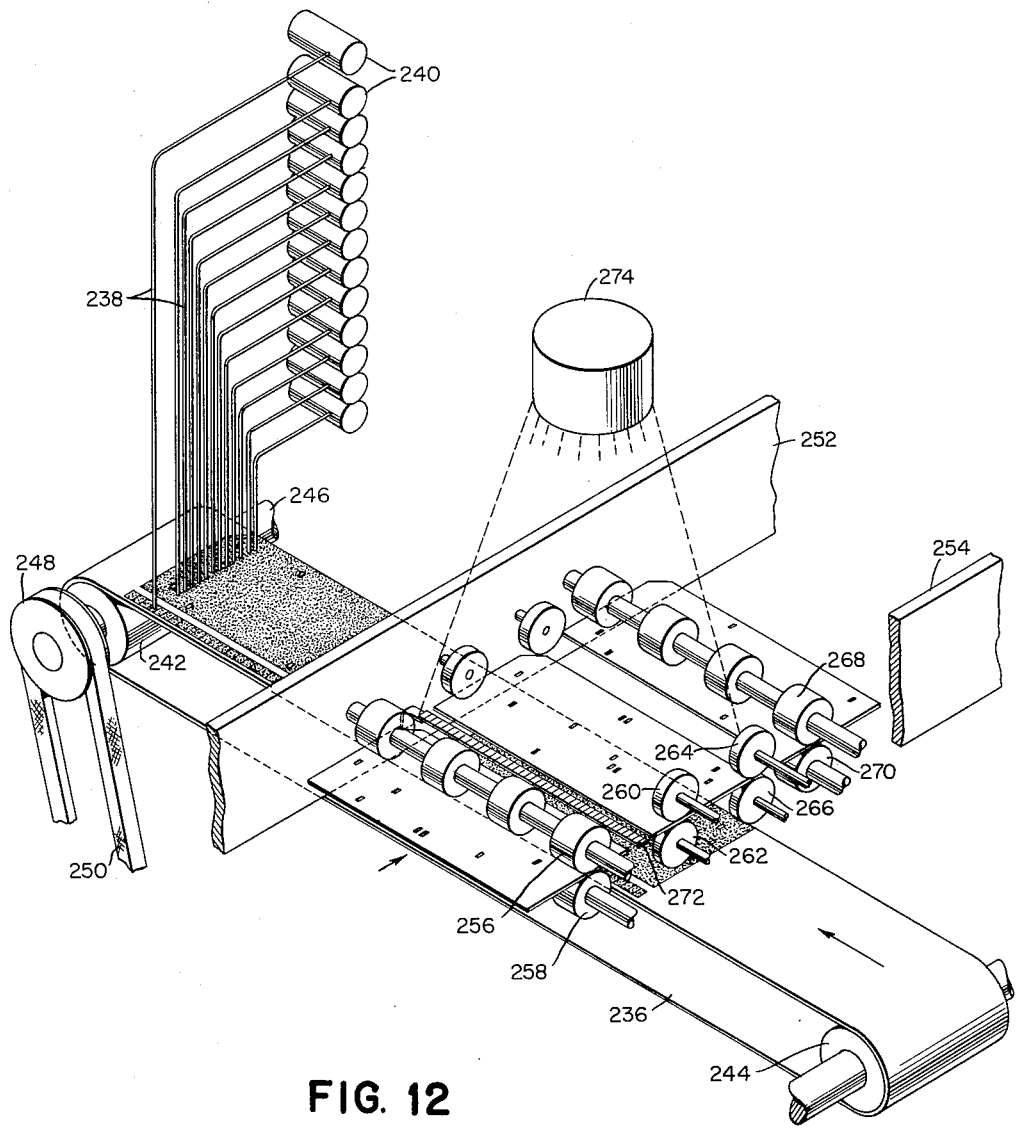
FIG. 12 is a view in perspective of a second embodiment of the invention.

A second embodiment of the invention is shown in FIG. 12. In this embodiment, the phosphorescent surface 234 constitutes the coating on an endless belt 236 instead of on a drum, and light guides 238 are employed, instead of projection lens and mirrors, to conduct the light from the bright spots or pips on the phosphorescent surface to an array of photomultiplier tubes 240. The endless belt may be mounted between two pulleys 242 and 244, the shaft 246 of one being provided with a second pulley 248 for engagement by a driving belt 250. The cards may be advanced between a pair of vertical guide frames 252 and 254 by a mechanism such as the card feed mechanism of FIG. 11 earlier described and may include the first pair of advancing rolls 256 and 258, the intermediate slip rolls 260 and 262 and 264 and 266, as well as the eject rolls 268 and 270. As may be clearly seen in FIG. 12, the slip rolls only engage the card at its end edges so as not to interfere with the recording of the card image on the belt. In the absence of a quartz plate, a timing track 272 may be mounted adjacent the trailing edge of the card so that its image, too, may be recorded on the belt. After a lamp, such as 274, has been flashed, the continuous motion of the endless belt will carry the card and timing track image past the row of light guides 238 formed of a material such as Lucite. These light guides, which include the twelve for the respective card column index positions and an additional or thirteenth one for the timing track, conduct the light to the array of photomultiplier tubes 240 which will generate, respectively, voltages indicative of the presence or absence of perforations in corresponding card column positions and marks on the timing track. An embodiment constructed as disclosed in FIG. 12 is relatively inexpensive of construction, as it eliminates the need for costly mirrors and lens of a projection system, inasmuch as a sharp image of the entire card can be obtained due to the fact that the belt presents a flat surface which will record the whole card image substantially uniformly.

Figure 13:
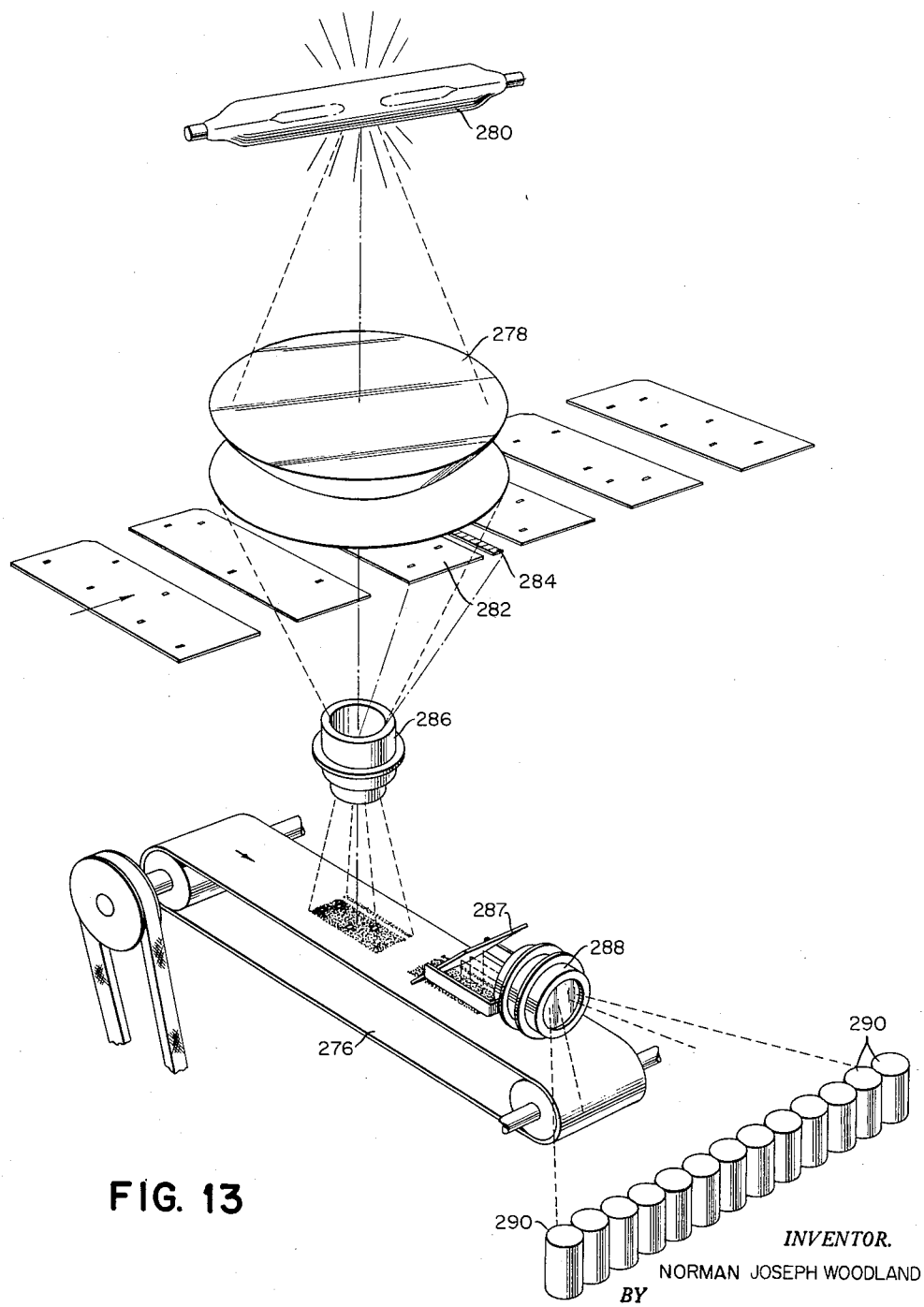
FIG. 13 is a view in perspective of still another embodiment of the invention.

Still another embodiment of the invention is shown in FIG. 13. In this embodiment, the image is recorded in reduced size upon a smaller endless belt 276. A condensing lens 278 is employed to refract the rays from a flash tube 280 and to direct them upon a card 282 and an adjacent timing track 284. Beneath the card there is disposed an objective lens 286 which images the card 282 and the track 284 upon the phosphorescent surface of the endless belt. The belt, which is continuously running, then carries the card and track images under a mirror 287 mounted at a 45° angle. This mirror redirects light emanating from the phosphor belt toward a second projection lens 288. This lens images the phosphorescent pips onto an array of photomultiplier tubes 290. Each phototube responds to the pips in its corresponding card row. This system is particularly useful where the absorption spectrum of the phosphors employed in the belt coating lies in the visible range and where compactness of construction is desired.

It will be evident that there has been provided an inexpensive arrangement for effecting the rapid serial reading of data contained in different columns of record cards. By feeding the cards sidewise, that is, in parallel with the card columns, the necessary card movement is reduced to a minimum. The maximum speed of the device is that in which negligible smearing of the bright spots or pips occurs on the phosphorescent storage. Hence, this maximum speed is a function of the relative velocities of the cards and the phosphorescent surface, as well as of the duration of the flash of the recording lamp.

It will also be evident that there are two ways of moving the cards with respect to the photoluminescent surface. In one, the card would be moved to a static position over the phosphorescent surface, and a flash lamp operated either automatically or at such time as the accounting machine in which the card reading unit is employed is in need of the card information. With a card feeding arrangement such as shown in FIG. 11, the clutch would be operated by energizing its magnet 134 and the card disposed in a position on the quartz plate 26. When the accounting machine signalled the need for the card information, a flash tube operating circuit, such as that shown in FIG. 7, would be operated to flash the lamp 22. Such an arrangement, therefore, provides a high access time to the card information, for immediately the card information is carried past the row of photomultiplier tubes PM, whereby the perforations at different index point positions in the card columns now appearing as bright spots or pips are translated into discrete electronic pulses. Such an arrangement might be termed light clutching, for the flashing of the lamp and the movement of the image downstream past the photomultiplier tubes is tantamount to accelerating a card by mechanical clutching means at an infinite rate. Moreover, such an arrangement nicely eliminates the acceleration problems normally attendant in mechanical clutches. Such an arrangement is also advantageous in that it permits a rereading of the same card as often as is needed. Thus, the flash lamp may be operated repeatedly, and only when the accounting machine is in need of a new card would the clutch magnet be operated to eject the old card from the quartz plate into a stacker or feeding a new card from the bottom of the hopper to the static position on the quartz plate.

The second way of handling the cards would be to feed successive ones as rapidly as possible. An arrangement such as that of FIG. 11 could be employed with the clutch magnet 134 being cyclically or continuously pulsed so as to maintain the clutch continuously engaged. On the other hand, it may be advisable to utilize any of the other conventional card feeds which feed successive cards from the bottom of the hopper as rapidly as is mechanically possible. Such cards might be flight sensed as they passed over the phosphorescent surface. The operation of the lamp may be synchronized with the operation of such a card feeding mechanism, or a card lever could be disposed in the card path to trigger the flash lamp when the card was in the momentarily correct position over the phosphorescent belt. It can be seen that this method would lend itself to extremely high speeds, being limited only by the activation period for the phosphors employed in the phosphorescent surface and the duration of the lamp flash necessary to effect the significant activation of the phosphor. Of course, the belt must be operated at such speeds as will remove the image of one card from the recording position before the lamp is flashed for the following card.

It will be recalled that the machine is also provided with a timing mask which records a timing image at the same time that the card image is recorded on the phosphorescent surface. Thus, there is provided a self-timing feature which greatly simplifies the controls while at the same time lending itself to extremely high reading rates.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In an apparatus for reading cards wherein information is marked in columns juxtaposed across the length thereof, a moving surface bearing phosphorescent material, means for feeding in their columnar direction successive cards to a recording position for said moving surface, a flash lamp operable to record the image of a card in said position upon said phosphorescent surface, and means for sensing the card image column-by-column as it is moved thereby.

2. In an apparatus for reading cards wherein data is recorded as a coded combination of one or more perforations at selected index point positions in columns juxtaposed across the length thereof, a continuously movable endless surface bearing phosphorescent material, means for feeding successive cards in their columnar direction to a recording position for said endless surface, a flash lamp operable to record the image of a perforated card in said position upon said endless surface, and means operable to sense the card column images serially as successive card images are moved thereby.

3. In an apparatus for reading cards wherein data is recorded as a coded combination of one or more perforations at selected index point positions in columns juxtaposed across the length thereof, a continuously movable endless surface bearing phosphorescent material, means for feeding successive cards in their columnar direction to a recording position for said endless surface, a flash lamp operable to record the image of a perforated card in said position in the form of bright spots for corresponding perforations on the endless surface, and a photoelectric sensing means for each row of index positions operable to sense the presence or absence of a corresponding bright spot in successive card column images as the endless surface carries the card image thereby.

4. In an apparatus for reading cards wherein data is recorded as a coded combination of one or more perforations at selected index point positions in columns juxtaposed across the length thereof, a continuously movable endless surface bearing phosphorescent material, means for feeding cards in their columnar direction to a recording position for said endless surface, a timing track having an aperture for each card column and disposed adjacent said recording position, a flash lamp operable to record the image of a card in said position and of said timing track in the form of bright spots for corresponding perforations and apertures upon the endless surface, photoelectric sensing means for each index point position in a card column and said timing track to detect the presence of a corresponding bright spot, output leads for each card column, a counter having a number of stages equal to the number of card columns and stepped along by the operation of the timing track photoelectric sensing means, and means operated by the counter to switch the outputs of the remaining photoelectric sensing means to the leads for the corresponding card columns as the card column images move past the photoelectric sensing means.

5. In an apparatus for reading cards wherein data is recorded in columns juxtaposed across the length thereof, a continuously movable endless surface upon which a recorded image disintegrates within about one revolution thereof, means for disposing cards in a recording position so that their column images will be recorded transversely upon said endless surface, a timing track having a mark for each card column, means operable to record the image of a card in said position and of said timing track on said surface, means operable to serially sense column images successively presented by the moving surface, means operable to serially sense mark images successively presented by the moving surface, and means operated by the mark image sensing means to switch the data successively read by the column image sensing means.

6. In an apparatus for reading cards wherein data is recorded as a coded combination of one or more perforations at selected index point positions in columns juxtaposed across the length thereof, a continuously movable endless surface bearing phosphorescent material, a flash lamp, a mask positioned in the optical path between said lamp and said endless surface so as to be recorded endwise on the latter, said mask having an aperture for each index point position on a card, said apertures gradually decreasing in size from a maximum at one end to a minimum at the other end, means for positioning cards on said timing mask, means for operating the flash lamp to record the image of a card on said mask on said endless surface, and photoelectric sensing means operable to read the card column images serially as the card image is moved thereby.

7. In a device for reading serially the data contained on each of successive record cards, movable phosphorescent means, means for feeding cards sequentially to a recording position for said phosphorescent means, means for recording on said phosphorescent means the images of the cards in said position, and means for serially sensing the individual data images of each card image when carried thereby by the phosphorescent means.

8. In a device for reading serially the data contained on each of successive record cards, a continuously moving endless phosphorescent surface, means for feeding record cards sequentially to a recording position for said phosphorescent surface, means for momentarily exposing the record cards in said position to a flash of light, and means for serially sensing the individual data images of each card when carried thereby by the phosphorescent surface.

9. In a device for reading serially data contained on each of successive record cards, a continuously moving endless phosphorescent surface, means for feeding record cards sequentially to a recording position for said phosphorescent surface, means for exposing the record card at said position to a flash of light, and means for sensing the individual data images of the card images transported thereby by said moving phosphorescent surface, the phosphor of said endless surface having a decay time less than that required for the endless surface to carry a newly recorded image past said sensing means and again thereto.

10. In a device for reading serially data contained as perforations of index point positions in parallel columns on each of successive cards, means for feeding said cards sequentially in the columnar direction to a recording position, a continuously moving phosphorescent surface travelling in a path transverse to the direction that the card column images will be recorded thereon, means for exposing the record card at the position to a source of light to record the perforations in the card as corresponding light spots on the surface, and means for detecting the light spots of each card column image on said surface as the card image is moved thereby by the moving surface.

11. In a device for reading serially data contained as perforations on each of successive record cards, a movable phosphorescent surface, means for feeding cards sequentially to a recording position for said surface, means for exposing the card at said position to a light source, means for moving the surface so that successive images of successive record cards are formed as separate entities thereon, and means for detecting and analyzing the data of the respective record cards appearing as differentially spaced images on the surface.

12. In a device for reading serially data contained as perforations at different index point positions in parallel columns on each of successive record cards, a phosphorescent surface, means for feeding said record cards in the direction of their columns to a recording position for said surface, means for exposing the card at said position to a light source, means for moving said phosphorescent surface at such speed that the images of successive cards do not overlap, and means for detecting and analyzing the data of the respective record cards appearing as differentially spaced images on the phosphorescent surface.

13. In a device for reading serially the data contained as perforations of different index point positions in parallel columns on each of successive record cards, a phosphorescent surface movable in a fixed path, means for feeding the record cards in the direction of their parallel columns to a recording position for said surface, means for exposing the card at the recording position to a light source to image their perforations as light spots on the surface, means for moving the surface at a speed sufficient to prevent overlapping of the images of successive record cards, and means for sensing the bright spots so as to detect serially the data contained in each column of the corresponding card.

14. In a device for reading serially the data contained as perforations of different index point positions in parallel columns on each of successive record cards, a continuously movable endless phosphorescent surface, means for feeding the record cards in the direction of their parallel to columns to a recording position for said surface, means for exposing the card at the position to a light source to image their perforations as light spots on the surface, means for moving the surface at a speed sufficient to prevent overlapping of the images of successive record cards, and means for sensing the images so as to detect serially the data contained in the columns of the corresponding card, said surface having phosphor whose decay time is less than that required for the surface to carry a newly recorded image past the sensing means and again thereto.

15. In a device for reading serially the data contained in successive columns of record cards as perforations of different index point positions therein, a continuously movable endless phosphorescent surface, means for feeding the record cards sequentially to a recording position for said phosphorescent surface, means for exposing the card at said position to a light source to image as light images the perforations contained therein, and means for serially sensing the different columns of spots formed on the phosphorescent surface for indications of the data contained on the corresponding record card columns, the phosphor in said surface having a decay time less than that required for the surface to transport a newly recorded image past the sensing means and again thereto.

16. In a device for reading the data contained in successive columns of record cards as perforations of different index point positions therein, a continuously movable endless phosphorescent surface, means for feeding the record cards sequentially to a recording position for said phosphorescent surface so that their column images will be recorded transversely thereupon, means for exposing the card at said position to a light flash to image as light spots the perforations contained therein, light guides for the respective rows of index point positions on a record card and having their one ends disposed in a row across said endless surface, and photoelectric means associated with each of the other ends of the respective light guides for effecting voltage variations indicative of a porforation at the corresponding record card column position, the phosphor in said surface having a decay time less than that required for the surface to transport a newly recorded image past the light guides and again thereto.

17. In a device for reading serially data contained as perforations of different index point positions in parallel columns on each of successive record cards, a continuously movable phosphorescent surface, means for feeding the record cards sequentially to a recording position for said surface, means for exposing a card in said position to a light flash, an optical system for forming a reduced image of the card on the phosphorescent surface, said image being formed with the column images transverse to the surface path, a plurality of light responsive devices corresponding in number to the number of index point positions in a card column, and means for directing the light formed by a column of bright spots constituting the images of card column perforations on the phosphorescent surface to said light responsive means.

18. In a device for reading serially data contained as perforations of different index point positions in parallel columns on each of successive record cards, a continuously movable phosphorescent surface, means for feeding the record cards sequentially to a recording position for said surface, means for exposing the card in the recording position to a light flash, an optical system for forming a reduced image of the card on the phosphorescent belt, said card image being formed with the column images transverse to the surface path, a plurality of light responsive devices corresponding in number to the number of index point positions in a card column, and a second optical system operative to direct the light emanating from the perforation images of successive column images on the phosphorescent surface to the respective light responsive devices.

19. The method of reading serially data contained as perforations at different index point positions in parallel columns on cards, comprising the steps of placing a card in a recording position, recording the image of the card in said position on a phosphorescent surface by flashing a lamp, and transporting the image so formed in a direction transverse to the column images past a row of photoelectric sensing devices of which there is one for each index point position in a column.

20. The method of claim 19 in which the image of a timing track having apertures equal in number to the number of card columns is also recorded and then transported to a photoelectric sensing device.

21. In a circuit for regulating the supply voltage obtained from a high voltage alternating current source for a photomultiplier tube having a cathode, a plurality of dynode stages, and an anode; a saturable reactor having a direct current or control and an alternating current winding; a first circuit for connection across a high voltage alternating current source and including the alternating current winding, a capacitor, and a diode; a voltage divider network for interconnecting the cathode, dynode stages, and anode, circuit means connecting one side of said capacitor to said cathode and the other side to said anode; a second circuit including a tube having a control grid and a cathode in series with the direct current winding of the saturable reactor; and a low pass filter connected between said anode and the control grid of the second circuit tube and operative to transmit gradual changes in the anode voltage level to vary the current in the second circuit and thereby the reactance of the saturable reactor which controls the amount of current flowing through the alternate current winding thereof.

22. A photoelectric sensing arrangement providing substantially constant sensitivity with markedly different photomultiplier tubes, a control circuit having a photomultiplier tube provided with an outlet lead, and means for providing constant light bias whereby the tube normally conducts more than its dark current so as to operate in a region wherein photomultiplier tubes otherwise different have substantially uniform response characteristics.

23. In an apparatus for reading cards wherein data is recorded as a coded combination of one or more perforations at selected index point positions in columns juxtaposed across the length thereof; a continuously movable endless surface bearing phosphorescent material; means for feeding successive cards in their columnar direction to a recording position for said endless surface; a flash lamp operable to record the image of a perforated card in said position in the form of bright spots for corresponding perforations on the endless surface; a photomultiplier tube having a cathode, a plurality of dynode stages, and an anode for each row of index point positions operable to sense the presence or absence of a corresponding bright spot in successive card column images as the endless surface carries the card image thereby; a saturable reactor having a direct current or control and an alternating current winding; a first circuit for connection across a high voltage alternating current source and including the alternating current winding, a capacitor, and a diode; a voltage divider network for interconnecting the cathode, dynode stages, and anode, circuit means connecting one side of said capacitor to said cathode and the other side to said anode; a second circuit including a tube having a control grid and a cathode in series with the direct current winding of the saturable reactor; and a low pass filter connected between said anode and the control grid of the second circuit tube and operative to transmit gradual changes in the anode voltage level to vary the current in the second circuit and thereby the reactance of the saturable reactor which controls the amount of current flowing through the alternate current winding thereof.

24. In an apparatus for reading cards wherein data is recorded as a coded combination of one or more perforations at selected index point positions in columns juxtaposed across the length thereof, a continuously movable endless surface bearing phosphorescent material, means for feeding successive cards in their columnar direction to a recording position for said endless surface, a flash lamp operable to record the image of a perforated card in said position in the form of bright spots for corresponding perforations on the endless surface, a control circuit having a photomultiplier tube provided with an outlet lead for each row of index point positions operable to sense the presence or absence of a corresponding bright spot in successive card column images as the endless surface carries the image thereby, and means for providing constant light bias for each photomultiplier tube whereby each tube normally conducts more than its dark current so as to operate in a region wherein photomultiplier tubes otherwise different have substantially uniform response characteristics.

25. In an apparatus for reading cards wherein information is marked in columns juxtaposed across the length thereof, a moving surface bearing radiant energy responsive material, means for feeding in their columnar direction successive cards to a recording position for said moving surface, a radiant energy device operable to record the image of a card in said position upon said radiant energy responsive surface, and means for sensing the card image column-by-column as it is moved thereby.

26. In an apparatus for reading cards wherein data is recorded as a coded combination of one or more perforations at selected index point positions in columns juxtaposed across the length thereof, a continuously movable endless surface bearing radiant energy responsive material, means for feeding successive cards in their columnar direction to a recording position for said endless surface, a radiant energy device operable to record the image of a perforated card in said position upon said endless surface, and means operable to sense the card column images serially as successive card images are moved thereby.

27. In a device for reading serially data contained as perforations of index point positions in parallel columns on each of successive cards, means for feeding said cards sequentially in the columnar direction to a recording position, a continuously moving radiant energy responsive surface travelling in a path transverse to the direction that the card column images will be recorded thereon, means for exposing the record card at the position to a source of radiant energy to record the perforations in the card as corresponding irradiated spots on the surface, and means for detecting the irradiated spots of each card column image on said surface as the card image is moved thereby by the moving surface.

28. In a device for reading serially data contained as perforations at different index point positions in parallel columns on each of successive record cards, a radiant energy responsive surface, means for feeding said record cards in the direction of their columns to a recording position for said surface, means for exposing the card at said position to a radiant energy source, means for moving said radiant energy responsive surface at such speed that the images of successive cards do not overlap, and means for detecting and analyzing the data of the respective record cards appearing as differentially spaced images on the radiant energy responsive surface.

29. In a device for reading serially the data contained as perforations of different index point positions in parallel columns on each of successive record cards, a continuously movable endless radiant energy responsive surface, means for feeding the record cards in the direction of their parallel columns to a recording position for said surface, means for exposing the card at the position to a radiant energy source to image their perforations as irradiated spots on the surface, means for moving the surface at a speed sufficient to prevent overlapping of the images of successive record cards, and means for sensing the images so as to detect serially the data contained in the columns of the corresponding card, said surface having radiant energy responsive material whose decay time is less than that required for the surface to carry a newly recorded image past the sensing means and again thereto.

30. In a device for reading serially data contained as perforations of different index point positions in parallel columns on each of successive record cards, a continuously radiant energy responsive surface, means for feeding the record cards sequentially to a recording position for said surface, means for exposing a card in said position to a source of radiant energy, an optical system for forming a reduced image of the card on the radiant energy responsive surface, said image being formed with the column images transverse to the surface path, a plurality of radiant energy responsive devices corresponding in number to the number of index point positions in a card column, and means for directing the radiant energy formed by a column of irradiated spots constituting the images of card column perforations on the radiant energy responsive surface to said radiant energy responsive means.

31. In a device for reading serially data contained as perforations of different index point positions in parallel columns on each of successive record cards, a continuously movable radiant energy responsive surface, means for feeding the record cards sequentially to a recording position for said surface, means for exposing the card in the recording position to a source of radiant energy, an optical system for forming a reduced image of the card on the radiant energy responsive surface, said card image being formed with the column images transverse to the surface path, a plurality of radiant energy responsive devices corresponding in number to the number of index point positions in a card column, and a second optical system operative to direct the radiant energy emanating from the perforation images of successive column images on the radiant energy responsive surface to the respective radiant energy responsive devices.

32. The method of reading serially data contained as perforations at different index point positions in parallel columns on cards, comprising the steps of placing a card in a recording position, recording the image of the card in said position on a radiant energy responsive surface by operating a radiant energy device, and transporting the image so formed in a direction transverse to the column images past a row of radiant energy sensing devices of which there is one for each index point position in a column.

33. In an apparatus for reading cards wherein information is marked in columns juxtaposed across the length thereof, a moving surface bearing radiant energy responsive material, means including a radiant energy source for imaging the card in the radiant energy responsive material so that the column images extend traversely of the path of the moving surface, means for sensing the card image column-by-column as it is transported, and means for establishing the surface material at a uniform radiant energy responsive level.

34. In combination, a record card having information thereon in the form of a plurality of apertures, information storage means comprising a surface having a phosphorescent material thereon, means for moving said card to a position adjacent said surface, means for emitting light through the apertures in said card toward said surface thereby to transfer said information to said surface, means for moving said surface in a direction transverse to the direction of movement of said card, and photosensitive means adjacent said surface spaced from said card in the direction of movement of said surface for reading the information transferred to said surface.

35. In combination, an elongated endless belt comprising phosphorescent material, means for moving said belt in its direction of elongation, an elongated punched card, driving means for moving said card in a direction transverse to its length to a first position adjacent said moving belt, means for halting said card adjacent said belt for a predetermined time interval, means projecting radiant energy through the prepunched holes in said card to said belt for a limited portion of said predetermined time interval thereby to excite portions of said phosphorescent material on said belt, and reading means adjacent said moving belt at a second position removed from that of said first position for producing a signal output responsive to the excited portions of said phosphorescent material.

36. The combination of claim 35 wherein the directions of movement of said belt and said card are transverse to one another.

37. The combination of claim 35, wherein erasing means are disposed after said second position and before said first position.

38. In combination, a record card having columns and rows of information thereon, a storage medium, means for moving said record card in a direction substantially parallel to the direction of the columns of information thereon to a position adjacent said storage medium, means for simultaneously transferring all of the information on said card to said storage medium, means for moving said storage medium in a direction transverse to the direction of movement of said card, and reading means adjacent the path of movement of said storage medium for reading the transferred information from said medium.

References Cited in the file of this patent
UNITED STATES PATENTS

| | | |
|---|---|---|
| 1,724,572 | Geisen | Aug. 13, 1929 |
| 2,203,352 | Goldmark | June 4, 1940 |
| 2,268,498 | Bryce | Dec. 30, 1941 |
| 2,325,941 | Dickinson | Aug. 3, 1943 |
| 2,532,731 | Potter | Dec. 5, 1950 |
| 2,575,034 | Tyler et al. | Nov. 13, 1951 |
| 2,645,724 | Rajchman et al. | July 14, 1953 |
| 2,647,436 | Schapiro | Aug. 4, 1953 |
| 2,672,288 | Perrin | Mar. 16, 1954 |
| 2,687,253 | McMillan | Aug. 24, 1954 |
| 2,688,703 | Di Giovanni et al. | Sept. 7, 1954 |
| 2,697,649 | Roth | Dec. 21, 1954 |
| 2,712,898 | Knutsen | July 12, 1955 |
| 2,727,685 | Wilson | Dec. 20, 1955 |
| 2,750,518 | Fahrner et al. | June 12, 1956 |
| 2,770,797 | Hamilton et al. | Nov. 13, 1956 |